United States Patent
Hahn et al.

(10) Patent No.: US 7,342,775 B2
(45) Date of Patent: *Mar. 11, 2008

(54) FLUTED ANODE WITH MINIMAL DENSITY GRADIENTS AND CAPACITOR COMPRISING SAME

(75) Inventors: Randy S. Hahn, Simpsonville, SC (US); Yongjian Qiu, Greenville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/524,643

(22) Filed: Sep. 21, 2006

(65) Prior Publication Data

US 2007/0035912 A1    Feb. 15, 2007

Related U.S. Application Data

(63) Continuation-in-part of application No. 11/199,626, filed on Aug. 9, 2005, now Pat. No. 7,116,548, which is a continuation-in-part of application No. 10/830,616, filed on Apr. 23, 2004, now abandoned.

(51) Int. Cl.
*H01G 9/04* (2006.01)
*H01G 4/228* (2006.01)

(52) U.S. Cl. .................. 361/528; 361/540
(58) Field of Classification Search ........ 361/528–529, 361/532–535, 540
See application file for complete search history.

(56) References Cited

U.S. PATENT DOCUMENTS

| | | | |
|---|---|---|---|
| 3,166,693 A | 1/1965 | Haring et al. ............... | 317/230 |
| 3,345,545 A | 10/1967 | Bourgault et al. .......... | 317/230 |
| 3,688,161 A | 8/1972 | Klein et al. ................. | 317/230 |
| 4,090,288 A | 5/1978 | Thompson et al. ......... | 29/570 |
| 4,097,916 A | 6/1978 | Piper .......................... | 361/433 |
| 4,520,430 A | 5/1985 | Long et al. ................. | 361/433 |
| 4,574,333 A | 3/1986 | Snyder ....................... | 361/433 |
| 4,791,532 A | 12/1988 | Gouvernelle et al. ...... | 361/529 |
| 4,945,452 A | 7/1990 | Sturmer et al. ............. | 361/529 |
| 5,357,399 A | 10/1994 | Salisbury .................... | 361/529 |
| 5,473,503 A * | 12/1995 | Sakata et al. ............... | 361/525 |
| 5,486,977 A | 1/1996 | Hasegawa ................... | 361/529 |
| 5,667,536 A | 9/1997 | Hasegawa .................. | 29/25.03 |
| 5,850,332 A | 12/1998 | Kunieda et al. ............ | 361/523 |
| 5,949,639 A | 9/1999 | Maeda et al. ............... | 361/523 |
| 6,120,728 A | 9/2000 | Hinzmann et al. .......... | 419/66 |
| 6,151,205 A * | 11/2000 | Kobayashi et al. ......... | 361/523 |
| 6,191,936 B1 | 2/2001 | Webber et al. ............. | 361/528 |
| 6,320,742 B1 | 11/2001 | Wada et al. ................ | 361/528 |
| 6,400,556 B1 | 6/2002 | Masuda et al. ............. | 361/523 |
| 6,493,214 B1 | 12/2002 | Kanetake et al. ........... | 361/531 |

(Continued)

FOREIGN PATENT DOCUMENTS

JP    2002359156    12/2002

OTHER PUBLICATIONS

Alpha-Core Flat Magnet Wire, pp. 1-4, Feb. 19, 2004 http://www.alphacore.com/flatwire,htm.
Patent Abstracts of Japan, 59-187129, Oct. 24, 1984, Mitsubishi Electrical Corp.

*Primary Examiner*—Eric Thomas
(74) *Attorney, Agent, or Firm*—Joseph T. Guy; Nexsen Pruet, LLC

(57) ABSTRACT

An anode with an anode body with a first side and a second side opposite to said first side, multiple anode wires and a conductive polymer cathode.

42 Claims, 11 Drawing Sheets

U.S. PATENT DOCUMENTS

| | | | |
|---|---|---|---|
| 6,546,837 B1 | 4/2003 | Neyer | 86/20.1 |
| 6,560,089 B2 | 5/2003 | Miltich et al. | 361/509 |
| 6,590,762 B2 | 7/2003 | Greenwood et al. | 361/523 |
| 6,849,292 B1 | 2/2005 | Huntington | 427/79 |
| 7,116,548 B2 * | 10/2006 | Satterfield et al. | 361/528 |
| 7,154,742 B1 * | 12/2006 | Hahn et al. | 361/528 |
| 2003/0053286 A1 | 3/2003 | Masuda et al. | 361/523 |
| 2004/0066607 A1 * | 4/2004 | Edson et al. | 361/528 |

* cited by examiner

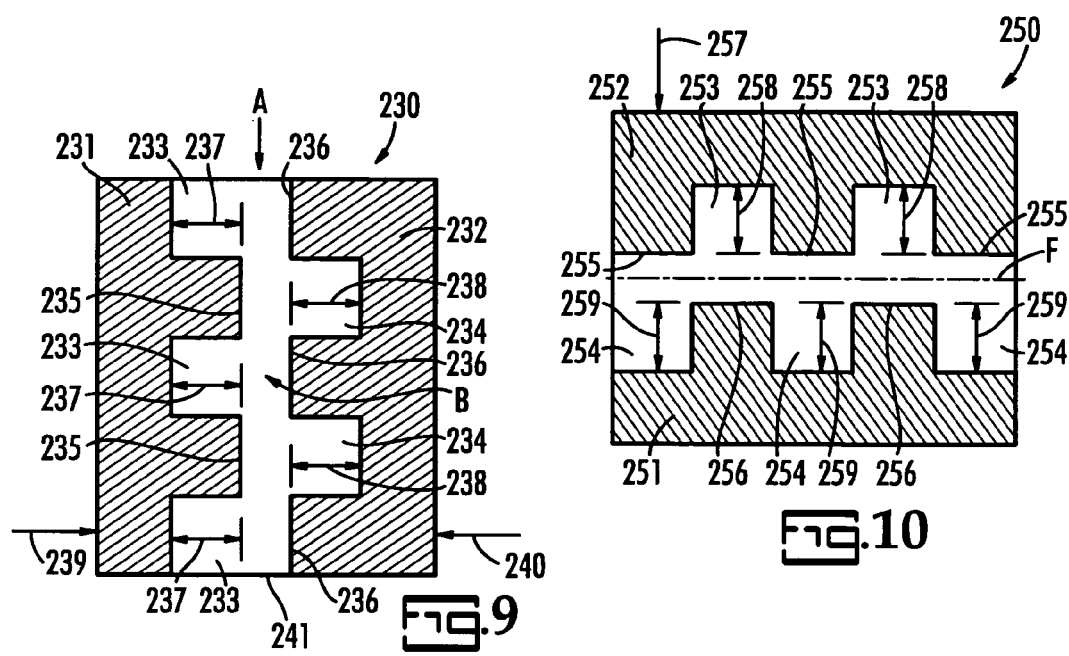
FIG. 9
FIG. 10
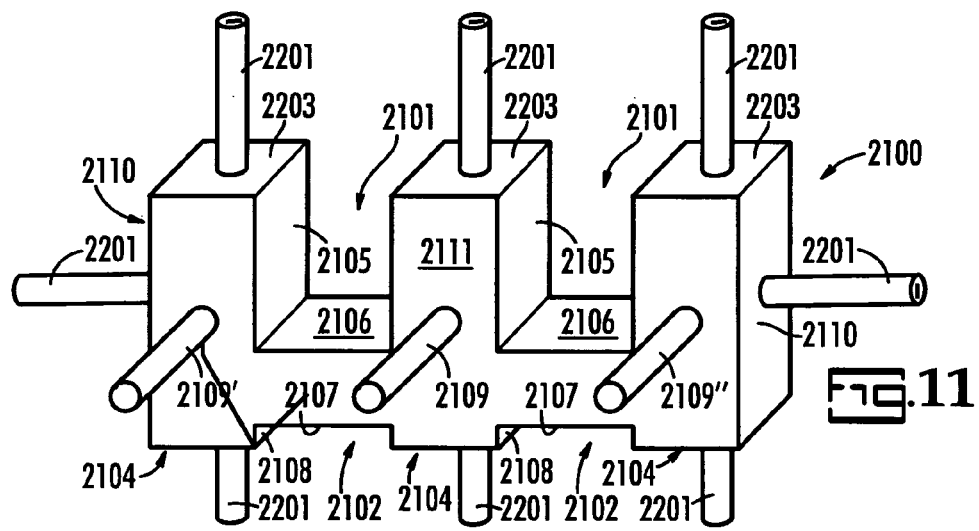
FIG. 11
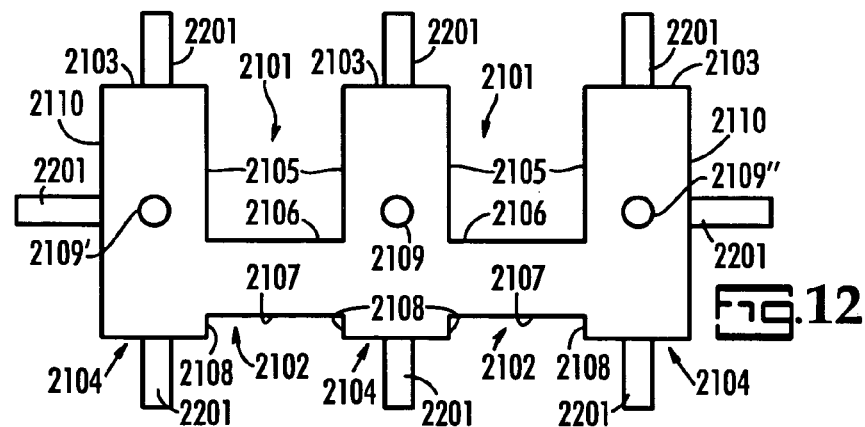
FIG. 12

FLUTED ANODE WITH MINIMAL DENSITY GRADIENTS AND CAPACITOR COMPRISING SAME

CROSS-REFERENCE TO RELATED APPLICATIONS

The present application is a continuation-in-part of U.S. patent application Ser. No. 11/199,626 filed Aug. 9, 2005, now U.S. Pat. No. 7,116,548 issued Oct. 3, 2006, which is in-turn a continuation-in-part application of U.S. patent applcation Ser. No. 10/830,616 filed Apr. 23, 2004 which is abandoned. This application is related to U.S. patent application Ser. No. 10/730,736 filed Dec. 8, 2003, now U.S. Pat. No. 7,207,103 issued Apr. 24, 2007, which is pending and incorporated herein by reference.

FIELD OF THE INVENTION

The present invention is directed to an improved anode with offset, or unequal, flutes and minimal density gradients, capacitors comprising the improved anode and the synergism of such anodes with conductive polymeric cathodes. More particularly the present invention is directed to an improved anode comprising flutes and multiple wires and anodes with a conductive polymer cathode.

BACKGROUND OF THE INVENTION

There is an ongoing need to improve the electrical characteristics of capacitors. In particular, there is a need to lower the ESR of capacitors.

The anode of a typical solid electrolytic capacitor consists of a porous anode body, with a lead wire extending beyond the anode body and connected to the positive mounting termination of the capacitor. The anode is formed by first pressing a valve metal powder into a pellet. Valve metals include Al, Ta, Nb, Ti, Zr, Hf, W, and mixtures, alloys or suboxides of these metals. The anode is sintered to form fused connections between the individual powder particles. There are several resistances to current flow in the anode portion of a solid electrolytic capacitor. The current must flow from the positive mounting termination to the lead wire attached to or embedded in the anode body. Current flows through the portion of the anode lead which extends outside the body of the anode. The current flow through the positive termination and the anode lead produce series resistances which contribute to the equivalent series resistance (ESR) of the finished device. Resistances inside the body of the anode generate parallel resistances which also contribute to the ESR of the finished device. The current travels from the point of lead wire egress to the anode body to all points of the anode body through the path(s) of least resistance. The current must pass from the lead wire into the anode body through points of contact between the lead wire and the particles which make up the porous anode body. The current must then travel through the porous anode body, through small necks of the sintered particles which make up the anode body.

Resistance in the lead wires and in the anodes body is governed by the general equation for resistance.

Resistance=resistivity×path length/cross sectional area.

Increasing the cross sectional area available for current flow reduces the resistance as indicated by the equation above. The maximum diameter of the lead wire is determined by the dimensions of the anode. The lead wire diameter can not be greater than the thickness of the anode. Thus the maximum cross sectional area for current to flow through a single cylindrical lead wire is $\pi d^2/4$ wherein d is the diameter. For a given wire diameter the maximum cross-sectional area for current flow increases proportionately to the number of lead wires connecting the anode body to the positive mounting termination. Thus by increasing the number of wires the resistance in the connection between the positive mounting termination and the anode body is reduced.

Although the lead wire(s) can be attached to the anode body, for example by welding to the top of the body, imbedding the lead wire(s) in the anode body reduces the resistance for current to flow. For lead wires which extend into the porous anode body the cross sectional area available for current to flow from the lead wire to the body is proportional to the external surface area of the lead within the body of the anode. Maximum Area is proportional to $\pi \times d \times l$ (for single cylindrical lead wires). The cross sectional area for this resistance term can be increased by increasing the number of lead wires. The path length for current to flow from the lead wire to points of the anode body which are the greatest distance from the lead wire is reduced by utilizing multiple lead wires or non-cylindrical lead wires, for example, flat or ribbon lead wire.

Fluted anodes comprising a furrow or groove on the otherwise monolithic capacitor body as described, for example, in U.S. Pat. Nos. 5,949,639 and 3,345,545 reduce the path length through the internal polymer and increase the cross-sectional area for current to flow through the external polymer. Capacitors utilizing fluted anodes as illustrated in FIG. 1 enjoy much success and this technique is still utilized in current capacitors. The preferred method for connecting a wire to the anode, is to have a wire in place when the compact is pressed. This allows the anode lead to pass through most of the length of the anode compact and maximize contact area between a solid wire anode lead, usually Ta wire for a Ta anode, and the Ta anode. The compact, after removal of binder, is sintered at ca. 1200-1600° C. The area of contact between wire and anode compact is limited by the diameter of the wire which is a function of the thickness of the compact. As the contact area between wire and anode compact decreases, the resistance at the point of contact is increased. As the wire gauge is increased, the internal resistance in the wire is increased. Both increases result in higher equivalent series resistance—ESR—which diminishes the performance of the capacitor.

Even though the use of fluted anodes has enjoyed much success the electrical properties achievable thereby have reached a plateau. Further improvement requires modifications of the anode or the process used to form the anode.

Through diligent research a limitation of radially compressed fluted anodes has been determined to reside in the variation in density created as a function of the process in which these anodes are formed. Density variations have been determined to be dependent on the type of compression. While not restricted to any theory it is postulated that variations in density cause variations in the impregnation of solid electrolyte that serves as the cathode of the electrolytic capacitor. It is also postulated that variations in density cause variations in the external coating coverage of the solid electrolyte. Referring to FIG. 1, the anode, 201, comprising an anode wire, 202, has flutes, 203. The anode is typically formed by radially pressing a powder perpendicular to the anode wire into the desired shape followed by sintering. Single stage compaction with formed punches induces a greater compaction ratio between the flutes than in the non-fluted regions whereby the density between flutes becomes higher than the density in the non-fluted regions. Alternatively, the anode is formed by axially pressing the powder parallel to the anode wire which causes surface burnishing which also inhibits external coating coverage.

By realizing this previously unappreciated phenomenon the present inventors have developed an improved fluted anode, and capacitor, which extends the properties of fluted anodes beyond that previously considered feasible thereby allowing for further improvements in electrical characteristics.

Yet another problem associated with fluted anodes is insufficient conduction between the anode and the cathode lead frame. A scanning electron microscope image of a cross-section of a partial capacitor is shown in FIG. 2. As shown, the cavity of deep, or wide, flutes causes difficulty when attempting to attach the anode over the entire surface of the cathode lead frame. Adequate adhesion is observed in the center of the lead frame with complete silver adhesive coverage of the center section. The two outer sections of the lead frame have inadequate contact seen as small portions of silver between the anode and the cathode lead frame. The loss in contact surface between the lead frame and the anode results in higher resistance at the interface resulting in higher ESR. Longer path lengths also increase ESR. As efforts to further improve the electrical characteristics of capacitors proceeds the ESR limitations caused by the poor surface contact rises to the fore as a limiting parameter in capacitor design. Increasing the conductive path length can also increase ESR and it is a desire to limit path length.

Through diligent research the present inventors have advanced the art of capacitor design, and more importantly the art of anode design and manufacture, beyond that considered feasible in the prior art therefore allowing for further improvements in electrical characteristics in the ongoing pursuit thereof.

SUMMARY OF THE INVENTION

It is an object of the invention to provide an improved fluted anode, and capacitor comprising the anode.

It is another object of the present invention to provide an anode with improved consistency in solid electrolyte impregnation.

A particular feature of the present invention is the ability to further improve electrical properties of capacitors, and circuits containing capacitors, without increases in ESR or inductance, while still maintaining high capacitance per unit volume.

A particular feature of the present invention is the ultra-low ESR capacitor, less than 7 mOhms and more preferably less than 6 mOhms, provided by the combination of a multi-lead wire fluted anode configuration using a conductive polymer cathode.

These and other advantages, as will be realized, are provided in an anode with an anode body with a first side and a second side opposite to the first side, a conductive polymer cathode and multiple anode leads. First flutes are on the first side and second flutes are on the second side.

Yet another embodiment is provided in an anode with an anode body with a first side and a second side opposite to the first side, a conductive polymer cathode and multiple anode leads. First flutes are on the first side and second flutes are on the second side. The first flutes have a depth which is at least 50% more than a depth of the second flutes.

A preferred method for forming the anode comprises the steps of:
placing a powder between a first die and a second die wherein the first die has first flutes and the second die has second flutes and the first flutes and the second flutes are offset;
placing at least two anode wires in the powder; and
decreasing the distance between the first die and the second die perpendicular to the at least two anode wires and compressing the powder there between.

Another method for forming the anode comprises the steps of:
placing a powder between a first die and a second die wherein the first die has first flutes and said second die has second flutes and the first flutes have a first depth and the second flutes have a second depth;
placing at least two anode wires in the powder; and
decreasing the distance between the first die and the second die perpendicular to the at least two anode wires and compressing the powder there between.

A particularly preferred embodiment is provided in a capacitor with an anode body having a first side and a second side opposite to the first side. The anode has first flutes on the first side and second flutes on the second side. At least two anode wires extend from the anode body and a dielectric coating is on the anode body. A conductive polymer coating is on the dielectric coating.

Yet another embodiment is provided in a capacitor having an anode body with a first side and a second side opposite to the first side. The anode body has first flutes on the first side and second flutes on the second side. The first flutes have a depth which is at least 50% more than a depth of the second flutes. At least two anode leads extend from the anode body and a dielectric coating is on the anode body. A conductive polymer cathode is on the dielectric coating.

Yet another embodiment is provided in a capacitor having an anode body with a first side and a second side opposite to the first side. The anode body has first flutes on the first side and at least two anode wires extending from the anode wherein at least one anode wire has a cross-sectional aspect ratio of at least 2.0 to no more than 100.0. A dielectric is coated on the anode body and a conductive polymer is coated on the dielectric.

DESCRIPTION OF DRAWINGS

FIG. 9 is a top or side view of a press as employed in horizontal compaction.

FIG. 10 is a side view of a press as employed in vertical compaction.

FIG. 11 is a top perspective view of an embodiment of the present invention.

FIG. 12 is a top view of the embodiment of FIG. 11.

DETAILED DESCRIPTION OF THE INVENTION

An improved anode for use in a capacitor is detailed wherein the anode has lower deviations in density, reduced resistance, better contact with the lead frame, and improved electrical characteristics of the capacitor resulting from the improvements in the anode. The anode has multiple anode lead wires. The cathode comprises a conductive polymer.

The present invention will be described with reference to the various figures forming an integral part of the specification. Throughout the various drawings similar elements will be numbered accordingly.

Resistance of a capacitor has been considered by those in the art to be primarily due to the resistance of the cathode and semiconductor layers with minimal contribution from the anode. This understanding is based on the large differences between the resistance of the anode, which is about $13.1 \times 10^{-6}$ Ω/cm for tantalum, as compared to about 1 Ω/cm for $MnO_2$ and about 0.01 Ω/cm for conductive polymers. For example, it is estimated that up to 90% of the ESR for a capacitor comprising a tantalum anode and a $MnO_2$ cathode is attributed to the $MnO_2$ cathode which has relative low conductivity. For these reasons the resistance of the anode has been ignored to a large extent. Any improvement in the resistivity of the anode would be expected to be such a negligible contribution that further advances were not considered. As described herein one of skill in the art would have no basis for considering a synergistic relationship between certain cathodes particularly with regards to lowering the overall resistance of the capacitive body.

Figure 1:
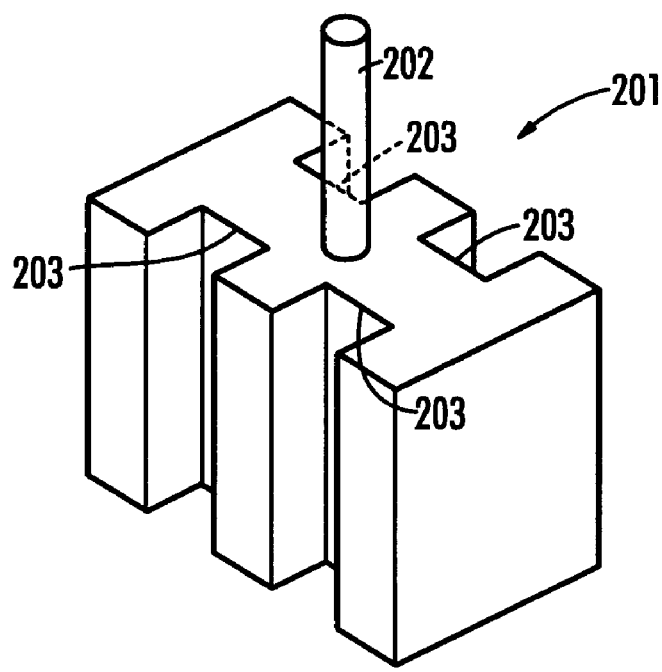
FIG. 1 is a perspective view of a prior art fluted anode.
Figure 2:
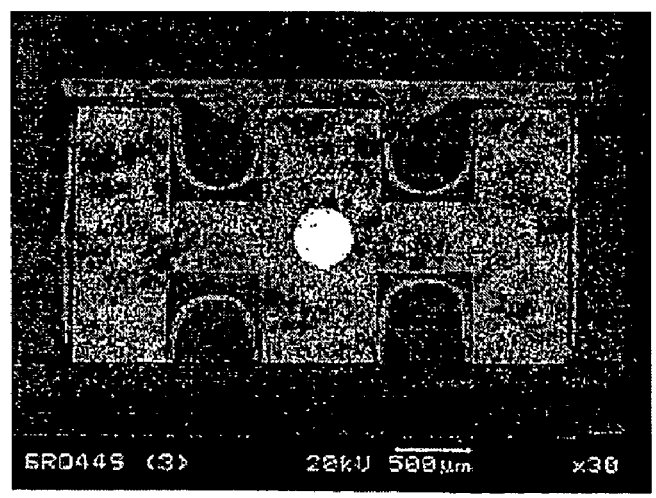
FIG. 2 is a cross-sectional view of a partial capacitor taken with a scanning electron microscope.
Figure 3:
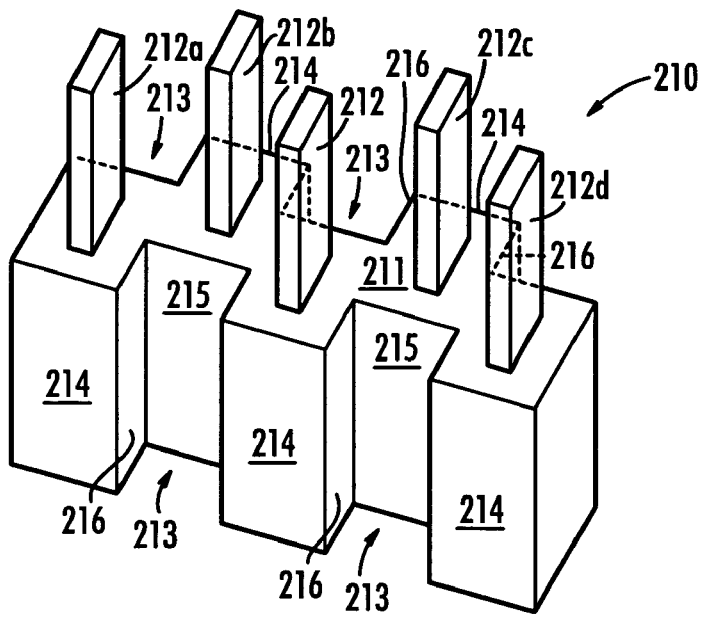
FIG. 3 is a top perspective view of an anode of the present invention.
Figure 4:
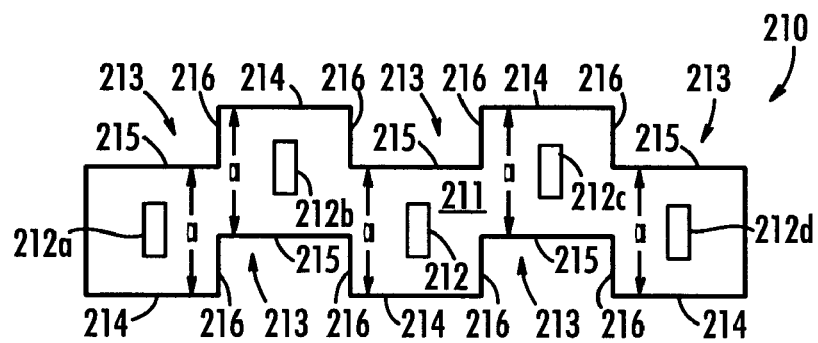
FIG. 4 is a top view of the anode of FIG. 3.

An anode of the present invention is illustrated in perspective view in FIG. 3 and in top view in FIG. 4. The anode generally represented at 210, comprises a radially compressed anode body, 211, and anode wires, 212, integral thereto. The anode wire may be welded to the anode body. In a preferred embodiment the anode wire is inserted into the anode powder and secured therein by pressing the powder to form the anode body and securing the anode wire therein by compression. A particularly preferred anode wire is a flat wire as further described infra.

The anode body, 211, comprises a series of offset flutes, 213, wherein there is minimal lateral projection between flutes. By minimizing the overlap of flutes the areas subjected to increased, or decreased, compression is minimized thereby decreasing the variation in density. Each flute face, 215, is preferably approximately the same distance "a" from an outer face surface, 214, directly across the capacitor body. In the embodiment each flute wall, 216, is approximately coplanar with a wall directly across the capacitor body since this represents a capacitor body with the same density throughout which is the theoretical limit and highly desirable.

Figure 5:
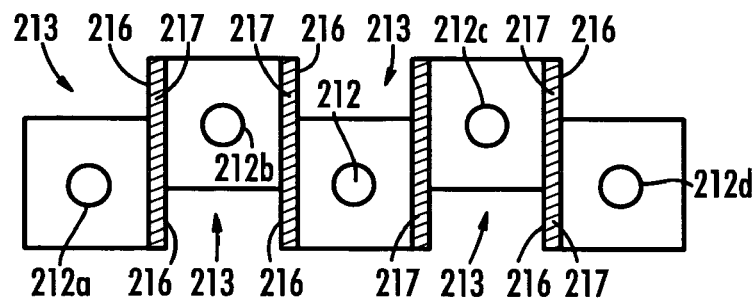
FIG. 5 is a top view of an embodiment of the present invention.
Figure 6:
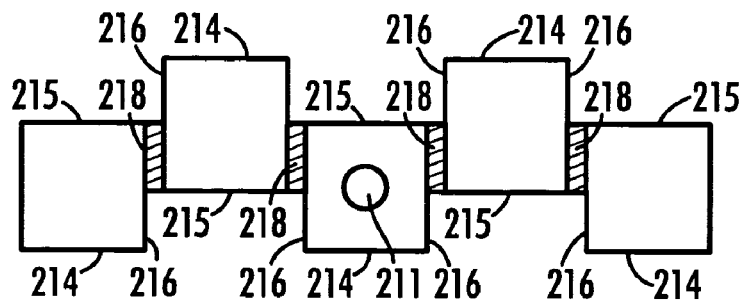
FIG. 6 is a top view of another embodiment of the present invention.

Another embodiment of a radially compressed anode of the present invention is illustrated in FIG. 5. In FIG. 5, the flutes, 213, are not planar across the capacitor body, 211, as may be realized in a manufacturing environment. While this is not preferred it is realized that variations may occur and slight variations are within the scope of the present invention. The deviation in size creates a low-density region, 217, between the imaginary planes containing opposing flute walls, 216. It is preferred that the low-density regions be minimized, preferably representing a cross-sectional area of less than about 30% of the total cross-sectional area of the capacitor body. It is more preferred that the low-density region represent less than about 20% of the total cross-sectional area and most preferably less than about 10% of the total cross-sectional area. In an analogous embodiment, alternating flutes may be slightly larger than desired leading to a high-density region between imaginary planes containing opposing flute walls, 216, illustrated as 218 in FIG. 6. It is preferred that the total sum of all high-density regions be minimized preferably representing a cross-sectional area of less than about 30% of the total cross-sectional area of the capacitor body. It is more preferred that the total sum of high-density regions represent no more than about 20% of the total cross-sectional area. As would be readily realized it is preferred that both high-density and low density regions be minimized. It is most preferred that the total sum of all regions of high-density and low-density represent less than about 50% of the total cross-sectional area of the capacitor body. More preferably the total sum of all regions of high-density and low-density represent less than about 30% of the cross-sectional area and even more preferably the total sum of all regions of high-density and low-density represent less than about 20% with no regions of high-density or low-density being the most preferred.

Figure 7:
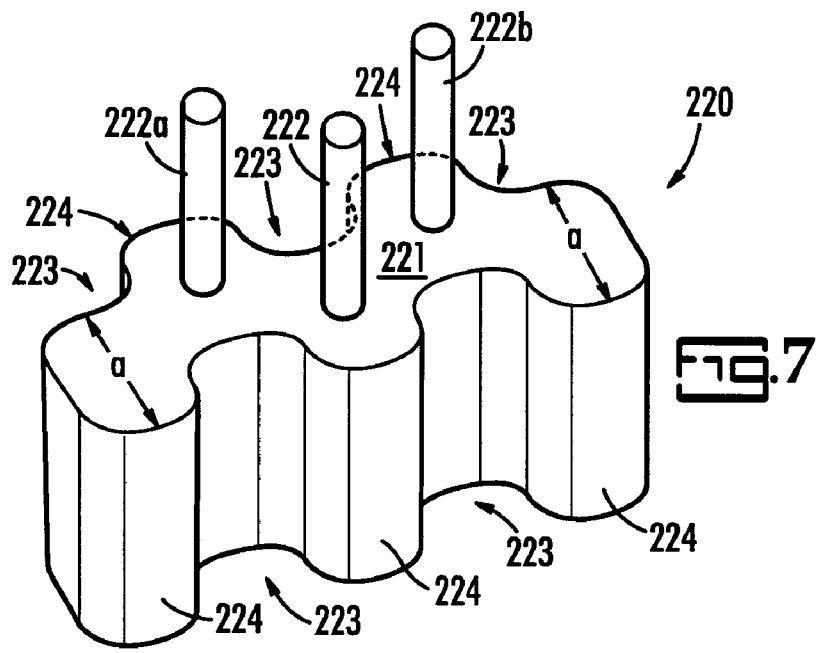
FIG. 7 is a top perspective view of yet another embodiment of the present invention.

Yet another embodiment is illustrated in FIG. 7. In FIG. 7, the anode, 220, comprises an anode body, 221, with anode wires, 222, attached thereto. The anode body comprises rounded offset flutes, 223, and rounded faces, 224. The distance across the capacitor "a" is preferably the same but in no case should the variation in parallel distances vary by more than 20% from the average distance. More preferably the distance across the capacitor "a" should have a variation in parallel distances of less than 5% from the average. It would be apparent from the description herein that variations in the distance across the surface of the capacitor represents areas of differing compression and therefore differing density.

Figure 8:
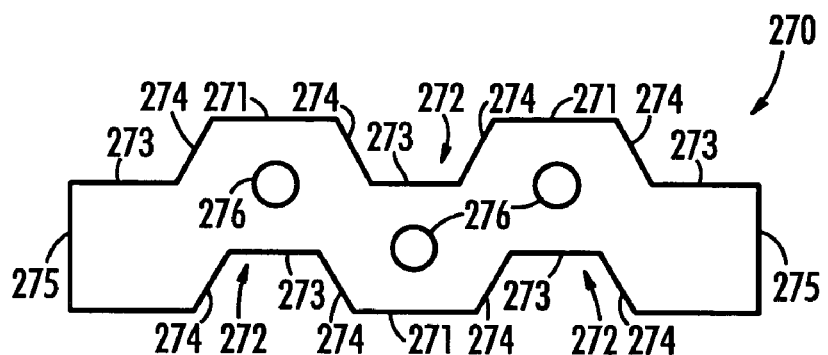
FIG. 8 is a top view of yet another embodiment of the present invention.

Yet another embodiment of the present invention is set forth in FIG. 8. In FIG. 8 the anode, 270, comprises chamfered islands, 271, and chamfered flutes, 272, with an angled flute wall, 274, there between. The ends, 275, may be planar as illustrated and preferred however chamfered or rounded ends are contemplated. At least two anode wires, 276, extend from the anode preferably parallel to the flutes however they can be incorporated on other surfaces as set forth herein for other embodiments.

The method of pressing an anode with offset flutes is preferably selected from horizontal compaction and vertical compaction with horizontal being defined as compaction substantially perpendicular to gravity and vertical being defined as substantially parallel to gravity. With horizontal compaction the opposing dies each have flutes of the same size. It would be understood that the die forms the negative structure and a flute of the die ultimately corresponds to an island in the compressed anode. Similarly, an island on the die corresponds to a flute in the compressed anode. With vertical compaction the upper die and lower die must have a different flute depth to ensure that compression is consistent across the capacitor anode. The details of the dies will be described in more detail with reference to FIGS. 9 and 10.

The method of compressing the powder into an anode will be described with reference to FIGS. 9 and 10. FIG. 9 illustrates a horizontal compaction and FIG. 10 illustrates a vertical compaction.

In FIG. 9, powder is typically introduced at point "A" or at point "B". Introduction at point "B" is preferred. In either case the appropriate amount of powder is added between the dies. The left die, 231, comprises flutes, 233, with a depth, 237, defined as the distance between top of the island, 235, and the bottom of the flute. The right die, 232, also comprises flutes, 234, with a depth, 238, defined as the distance between the top of the island, 236, and the bottom of the flute. The depth of the flutes in the left die, 237 is preferably the same as the depth of the flutes in the right die, 238. It is preferred that the difference in depth of any given flute is no more than 10% of the average depth and more preferably no more than 5% of the average depth. Even more preferably the difference in depth of any given flute is no more than 1% of the average depth with no measurable difference being most preferred. The left die, 231, is pressed in the direction of arrow, 239, and the right die, 232, is pressed in the direction of arrow, 240. It is most preferred that the dies move inwardly at approximately the same rate. After reaching full compression it is preferred that the dies be separated allowing the anode to be removed for sintering.

A method for vertical compaction will be described relative to FIG. 10. Vertical compaction utilizes a bottom die, 251, and top die, 252. In one embodiment the bottom die is a fixed die. The powder is placed on the bottom die and the top die is lowered thereon. The bottom die, 251, comprises flutes, 254, and islands, 256, and a distance, 259, defined as the height of the top of the island relative to the floor of the flute. The top die, 252, also comprises flutes, 253, and islands, 255, and a distance, 258, defined as the height of the top of the island relative to the floor of the flute. The powder is typically filled to the dotted line illustrated as "F". The top die is then pressed towards the bottom die in the direction of arrow, 257. While not restricted to any theory it has been observed that the material in the island formed by the flute in the lower die has a higher density than the material in the island formed by the flute in the upper die after compression. This density gradient can be mitigated by having a flute depth for the top die (TD) related to the flute depth of the bottom die (BD) by the relationship:

$$TD \cong BD*(1-CR)$$

wherein CR is the compaction ratio defined as the final compression height divided by the initial powder fill height using consistent units for all variables wherein the deviations from equality are less than about 10%. The powder fill and compression height are measured from the bottom of the flute 254.

Another embodiment of the present invention is the use of unequal flute depths as illustrated in front perspective view in FIG. 11 and front view in FIG. 12. The anode, generally represented at 2100, comprises major flutes, 2101, and minor flutes, 2102, wherein the depth of the major flutes is larger than the depth of the minor flutes. It is preferable that the depth of the major flutes is at least 50% more than the depth of the minor flutes. It is more preferred that the depth of the major flutes is at least 100% more than the depth of the minor flutes with at least 200% being more preferred. Each major flute has a major face, 2103, a major base, 2106, and major walls, 2105. Each minor flute has a minor face, 2104, a minor base, 2107, and minor walls, 2108. In one embodiment the minor flutes and minor bases are coplanar and there is no minor wall. In a preferred embodiment the faces are all parallel with the major faces being approximately coplanar and the minor faces being approximately coplanar. It is also preferred that all bases are approximately parallel with coplanar major bases and coplanar minor bases. The transition between the various defined structural elements, flutes or islands may be somewhat rounded or chamfered. The anode has a front face, 2111, with at least one anode wire, 2109, extending therefrom. A back face, preferably parallel to, and the same shape as, the front face is not seen but would be realized from the description herein. In lieu of, or in addition to, anode wires on the front face, side anode wires, 2201, may extend from side walls, 2110, a major face, 2103, or a minor face, 2104 or any combination thereof with anode wires on the front face only being most preferred.

The cathode lead frame is preferably adhesively attached to the minor faces, 2104, as would be realized to improve contact. In an alternative embodiment the cathode lead frame can be adhesively attached to the major faces, 2103, to decrease the conduction path length from the cathode lead frame to the opposite side of the anode. It would be apparent to one of skill in the art that the cathode would be attached to a face which does not have an anode wire.

In a particularly preferred embodiment the percent deviation in density in any region of the anode is no more than 10% from the average density. More preferably, the percent deviation in density in any region of the anode is no more than 5% from the average density and most preferably the percent deviation in density in any region of the anode is no more than 1% from the average density. Low deviations in density are preferably achieved using a radial compaction press as described in FIGS. 13-21 and 25-30.

Figure 13:
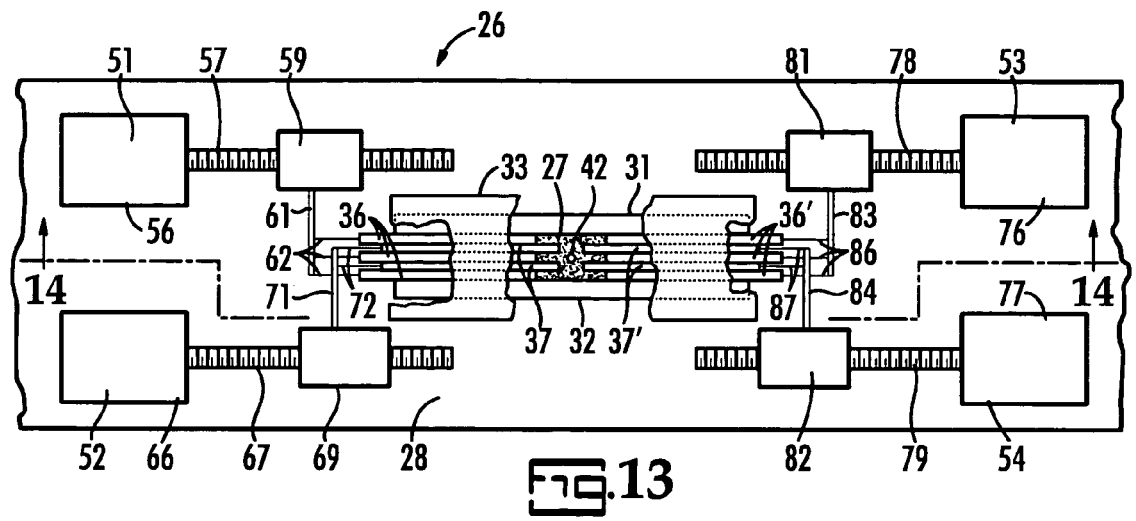
FIG. 13 is a top view of a horizontal multistage compaction press with parts broken away for illustration purposes.
Figure 14:
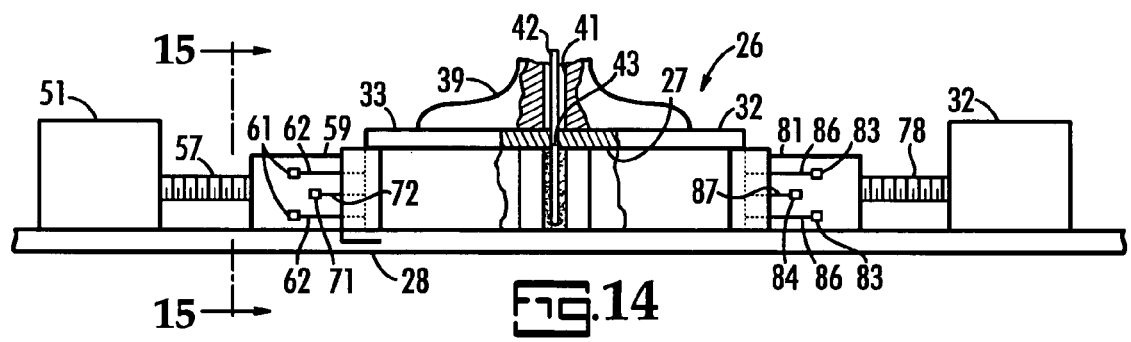
FIG. 14 is a view taken alone line 14-14 in FIG. 13 with parts broken away for illustration purposes.
Figure 15:
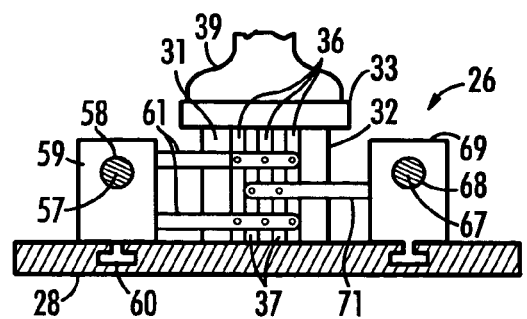
FIG. 15 is a view taken along line 15-15 of FIG. 14.

A horizontal powder press 26 is illustrated in FIGS. 13, 14 and 15. An elongated compression chamber 27 of uniform quadrilateral cross section is formed by a bottom wall in the form of flat support 28, a pair of parallel side walls 31, 32 having confronting parallel vertical surfaces of equal height extending upwardly from the upwardly facing surface of the support 28 and a top wall 33 having a flat bottom surface in engagement with the coplanar top surfaces of the side walls 31, 32. A set of six opposed rib punches 36, 36' and a set of four opposed channel punches 37, 37' extend into opposite open ends of the compression chamber 27. The linearly reciprocable rib punches 36 and channel punches 37 are interleaved flat plates. The top wall 33 is held in place on the top surface of the side walls 31, 32 by a press foot 39 which has a vertically extending opening 41 for accommodating a wire 42 inserted through an opening 43 in the top wall 33 and into the powder compression chamber 27.

Four powered drive mechanisms 51, 52, 53, 54 are mounted on the support 28. The drive mechanism 51 includes an electric motor 56 secured to the support 28 and driving a horizontally disposed screw 57 which extends through a threaded opening 58 in a thrust block 59. The thrust block 59 has a T-bar tongue and groove connection 60 with the support 28 permitting the thrust block 59 to move in the axial direction of the screw 57 when the screw is rotated by the motor 56. The thrust block 59 includes a pair of cantilever arms 61 which are connected to the rib punches 36 by thrust bars 62. The drive mechanism 52 includes a powered driver in the form of an electric motor 66 having an output screw 67 in threaded engagement with an internally threaded opening 68 through a thrust block 69. The thrust block 69 has a T-bar tongue and groove connection with the support 28. The thrust block 69 includes a cantilever arm 71 which is connected to the channel punches 37 by thrust bars 72.

The drive mechanisms 53, 54 in a similar manner include electric drive motors 76, 77, screws 78, 79 and screw blocks 81, 82 connected to the rib and channel punches 36', 37' by thrust arms 83, 84 and thrust bars 86, 87.

Figure 16:
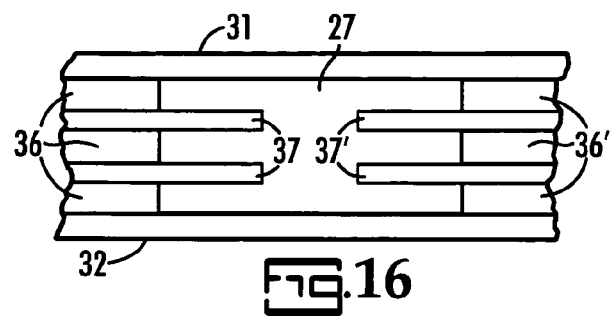
FIG. 16 is a partial top view of the press of FIG. 13 showing rib and channel punches in their non-compacting position.
Figure 17:
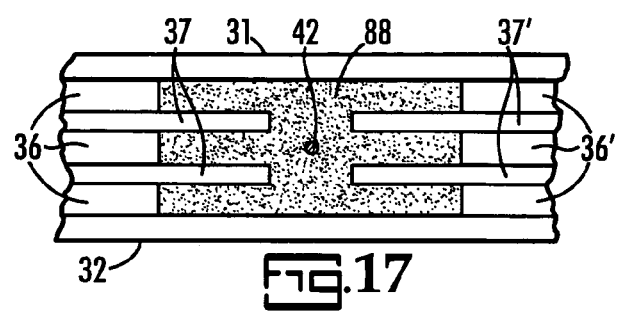
FIG. 17 is a top view similar to FIG. 16 showing powder deposited in the compression chamber.
Figure 18:
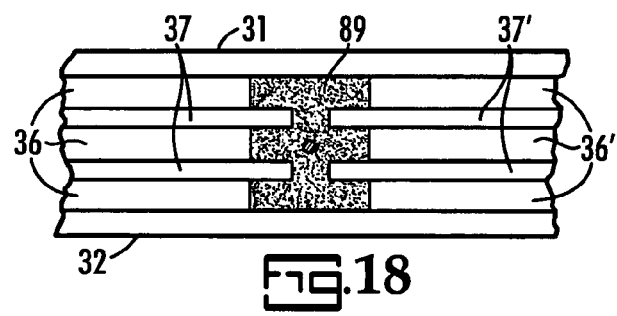
FIG. 18 is a top view of the compression chamber showing the rib and channel punches in their compacting positions and the capacitor element in its compacted condition.

FIG. 16 is a top view of an empty compression chamber 27 of the press 26 with the top wall 33 and the press foot 39 removed. The compression chamber 27 is ready to be filled with valve powder. The rib and channel punches 36, 36', 37, 37' have been adjusted to appropriate non-compacting or powder loading positions to achieve the desired degree of compaction during the compaction phase of operation. In the example illustrated in FIGS. 16-21 there is a 3 to 1 compaction ratio. FIG. 17 shows the compaction chamber filled with valve powder 88. The top wall, not shown, is placed on top of the side walls 31, 32 and the press foot 39, not shown, is brought to bear against the top wall 33, not shown. The wire 42 is then extended an appropriate depth into the powder 88. The powder 88 is now ready to be compacted into a capacitor element. During, compression, in the illustrated example, there is a 3 to 1 reduction in the distance between the opposed ends of the rib punches 36, 36' and there is a 3 to 1 reduction in the distance between the ends of the channel punches 37, 37' during compression. Thus both the rib areas and the web areas between the opposed channels will be equally compressed, that is, compressed to the same degree or extent. FIG. 18 shows the completion of the compaction step in the manufacturing process in which the rib and channel punches 36, 36', 37, 37' have been moved to their compacting position. The punches are moved from their non-compacting or chamber loading position shown in FIGS. 16 and 17 to their compacting position shown in FIG. 18 at speeds proportional to the distances they move from their non-compressing positions to their compressing positions. The rib punches 36, 36' move faster than the channel punches 37, 37' and both sets of punches arrive simultaneously at their compression or compaction positions shown in FIG. 18. Thus the rate of compaction of the powder in the rib areas of the element 89 is the same as the rate of compaction in the web between the oppositely disposed channels in the element 89. By starting compaction with the punches spaced at distances proportional to the finished width of the rib and web areas of the capacitor element 89 and by moving the punches during compression at speeds proportional to the distances traveled during compression, an element 89 of uniform density is produced.

Figure 19:
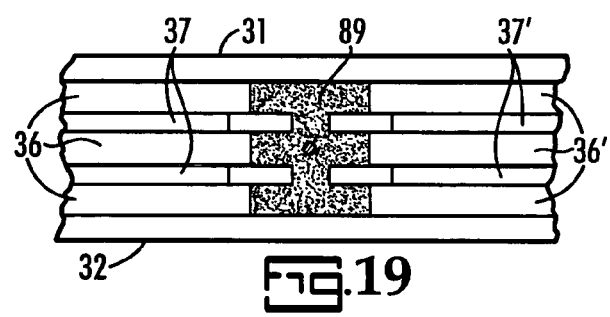
FIG. 19 is a top view of the compression chamber showing withdrawal of the channel punches from the capacitor element.

In the next manufacturing step, shown in FIG. 19, the channel punches 37, 37' are withdrawn from the channels formed in the element 89 and for operational purposes may be withdrawn to their powder loading positions shown in FIGS. 16 and 17. By keeping the rib punches 36, 36' in their compacting position while the channel punches 37, 37' are withdrawn, breakdown of the edges of the formed element 89 are avoided.

Figure 20:
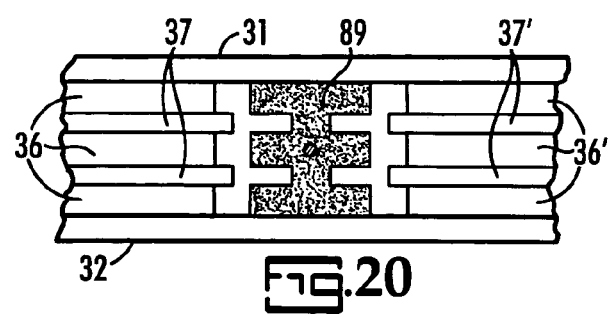
FIG. 20 is a top view of the compression chamber showing the rib and channel punches withdrawn from the capacitor element.
Figure 21:
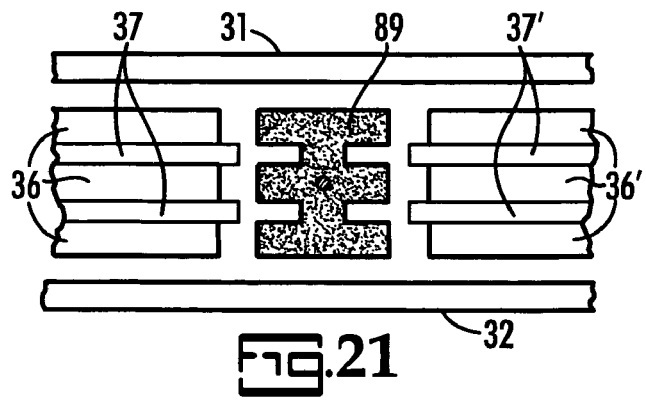
FIG. 21 is a top view showing withdrawal of a pair of side walls of the compression chamber.

As shown in FIG. 20, the rib punches 36, 36' have been withdrawn and may be positioned in their chamber loading position shown in FIGS. 16 and 17. In the next step of manufacture, shown in FIG. 21, the press foot 39 and the top wall 33 are raised and the side walls 31, 32 are moved laterally away from one another to completely release the element 89, which may now be removed without burnishing of the sides of the element 89.

Figure 22:
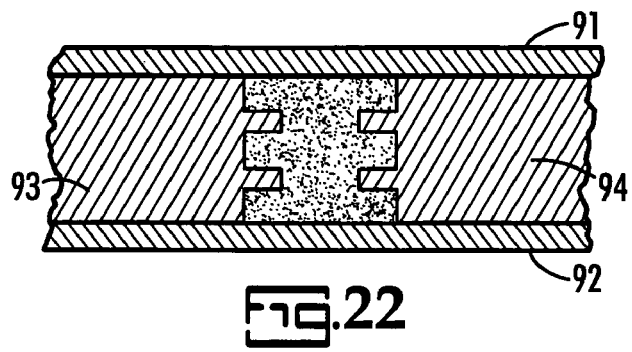
FIG. 22 is a section of a single stage compaction formed punch press showing powder in a compression chamber prior to compaction.
Figure 23:
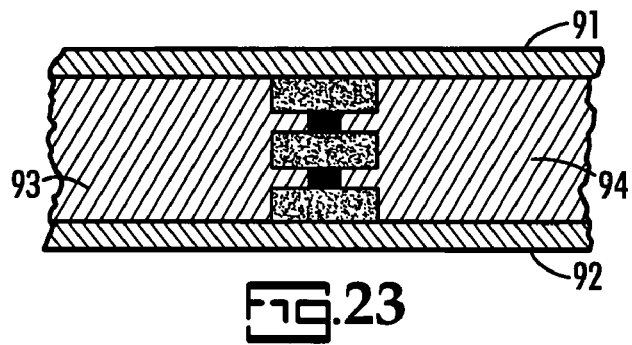
FIG. 23 is a section showing the punches of the press of FIG. 11 in their compaction position.
Figure 24:
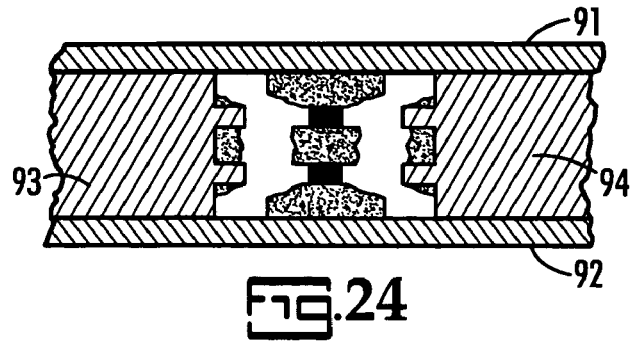
FIG. 24 is a section showing the punches of the press of FIG. 11 withdrawn from the compacted capacitor element.

FIGS. 22, 23 and 24 show a press manufacturing a capacitor element. After the compaction chamber, formed by side walls 91, 92, a bottom wall, not shown, and opposed punches 93, 94, is filled with powder, as shown in FIG. 22, and the top wall is closed, the opposed punches 93, 94 are moved to their compaction positions shown in FIG. 23. Since the channel forming parts of the punches 93, 94 move the same distance as the rib forming parts, the web areas between the channels are compressed to a greater extent than the ribs. The non-uniform compaction of the element is highly undesirable from a capacitor quality standpoint. When the punches 93, 94 are released or withdrawn, as shown in FIG. 24, portions of the element tend to break away because the pressure of the compacted powder within the confines of the punches is greater than the tensile strength of the compacted element. The foregoing deficiencies in the illustrated prior art powder compaction press are remedied by the herein disclosed invention.

Figures 25, 26:
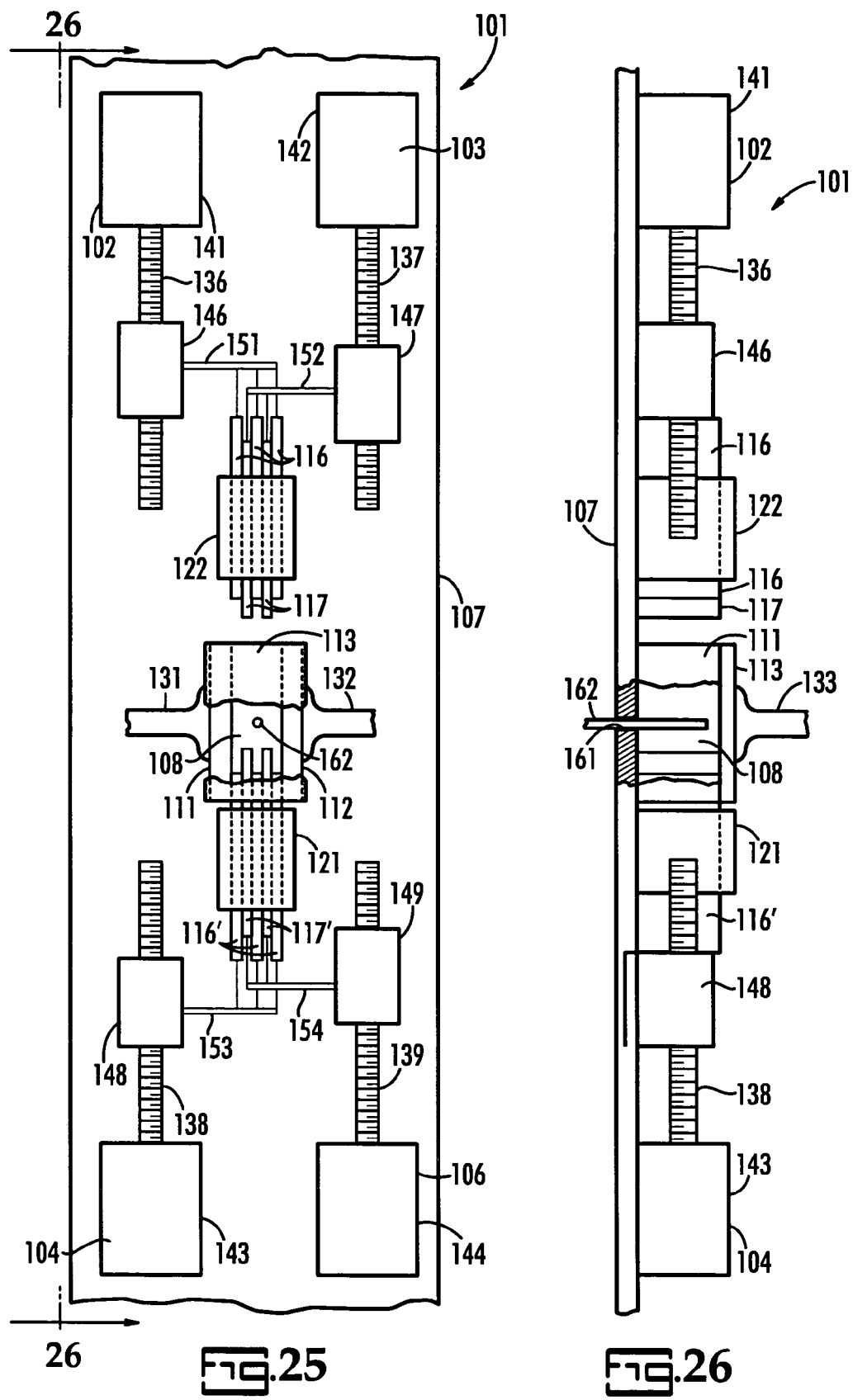
FIG. 25 is a side view of a vertical press with parts cut away for illustration purposes.
FIG. 26 is a view taken along line 25-25 of FIG. 25.

FIGS. 25 and 26 schematically illustrate a vertical press 101 embodiment of the invention. Four powered drive mechanisms 102, 103, 104, 106 are secured to a vertical support wall 107 and a valve powder compaction chamber 108 is formed by the vertical wall 107, side walls 111, 112, 113 and sets of opposed rib punches 116, 116' and sets of opposed channel punches 117, 117' which are supported in guide blocks 121, 122 mounted on the vertical wall 107. The side walls 111, 112, 113 are releasably held in place by press feet 131, 132, 133. Drive screws 136, 137, 138, 139 driven by electric motors 141, 142, 143, 144, threadingly engage threaded openings in thrust blocks 146, 147, 148, 149 which have siding tongue and groove connections with the wall 107 similar to that provided for the embodiment of the invention shown in FIGS. 13-15. The support wall 107 has an opening 161 through which a capacitor wire 162 can be inserted into the compaction chamber 108.

Figure 27:
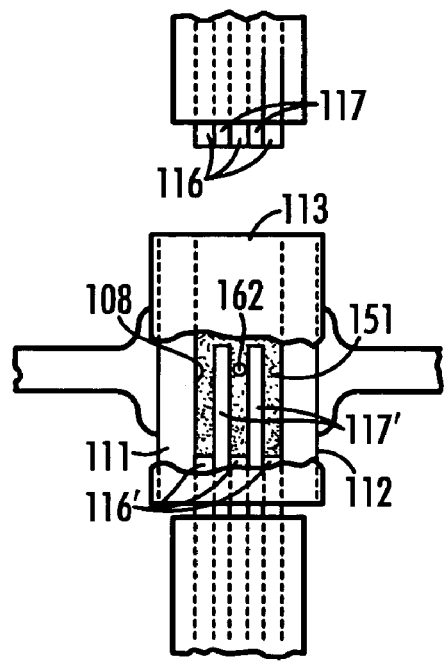
FIG. 27 is a partial side view with parts broken away to show a compaction chamber filled with powder.
Figure 28:
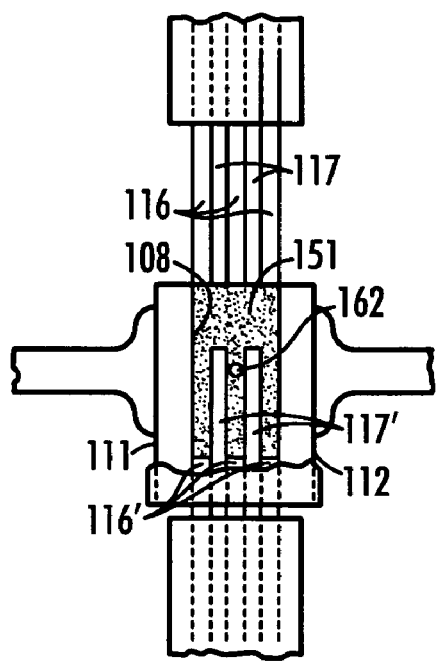
FIG. 28 is a partial side view showing upper rib and channel punches lowered to the top of the filled compaction chamber.

FIG. 27 shows the upper rib punches 116 and the upper channel punches 117 withdrawn from the compression chamber 108 sufficiently to permit valve powder to be placed in the compression chamber 108. The upper ends of the lower rib and lower channel punches 116', 117' are positioned to provide the desired amount of powder 151 for the element to be formed when the chamber 108 is filled to the top. The upper rib and channel punches 116, 117 are then lowered to close the top opening of the compression chamber 108 as shown in FIG. 28.

Figure 29:
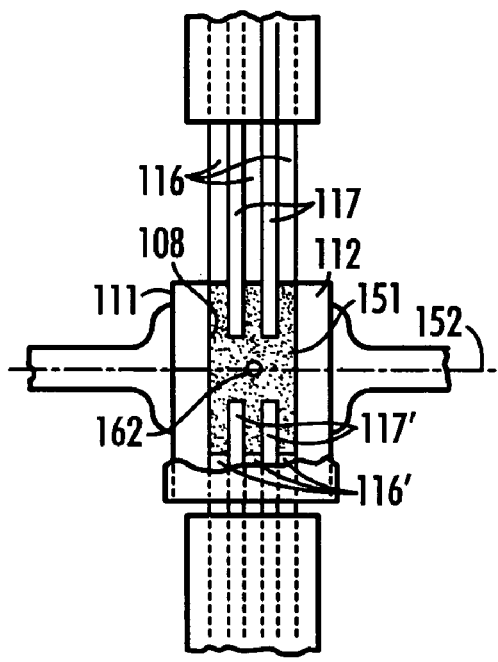
FIG. 29 is a partial side view showing the rib and channel punches adjusted to a desired pre-compaction position.

As shown in FIG. 29 the upper and lower channel punches 117, 117' are next adjusted to extend an equal distance into the compression chamber 108. This is accomplished by simultaneously lowering the upper and lower channel punches 117, 117' the same distance. The press is now ready for the compaction step. It will be noted that the wire 162 is centrally located in relation to the powder 151 to be compressed, the punches 116 and 116' are spaced equal distances from a horizontal plane 152 through the center of the wire 162 and the punches 117, 117' are also spaced equal distances from the horizontal plane 152. The element 153 shown in FIG. 23 is formed by a three to one compression of the powder 151. In other words the distance between the opposed rib punches 116 and 116', shown in FIG. 29, is reduced to one third in the compression step. Likewise the distance between the opposed channel punches 117, 117', shown in FIG. 29, is also reduced to one third in the compression step. In order to effect an equal rate of compression in the rib and web areas of the element, the opposed rib punches 116, 116' are moved toward one another faster than the channel punches 117, 117' are moved toward one another. The ratio of the speeds at which the rib and channel punches move in the compaction step is equal to the ratio of the distances said rib and channel punches move during the compaction step. An equal rate of compaction of the powder in the rib areas and the web areas between the channels is effected, thus avoiding lateral shifting of the powder during compaction. A uniform compaction density of the element 153 is achieved.

Figure 30:
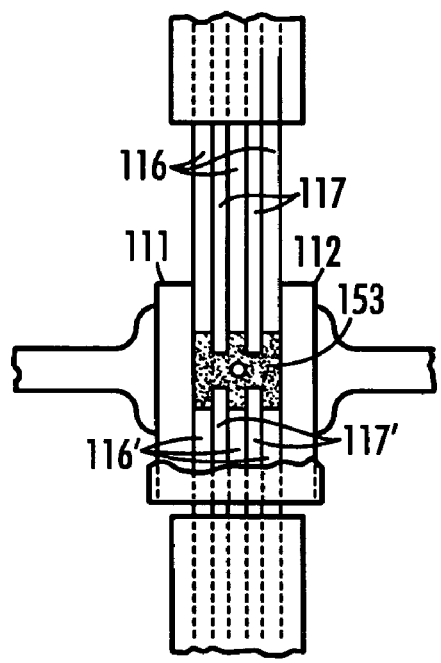
FIG. 30 is a partial side view showing the rib and channel punches in their compacting positions and the capacitor element in its compacted condition.

Following the compaction step illustrated by FIG. 30 the channel punches 117, 117' are retracted by the drive mechanisms 102, 103, 104, 106 from the element 153 and next the rib punches 116, 116' are retracted to a non-compacting position. Then the side walls 111, 112 and 113 are moved away from the element 153 to permit the element 153 to be removed without burnishing its surfaces. This retraction of the punches 116, 116', 117, 117' and shifting of the side walls is similar to the procedure employed in fabricating the element 92 by the horizontal press shown in FIGS. 13-21.

Figure 31:
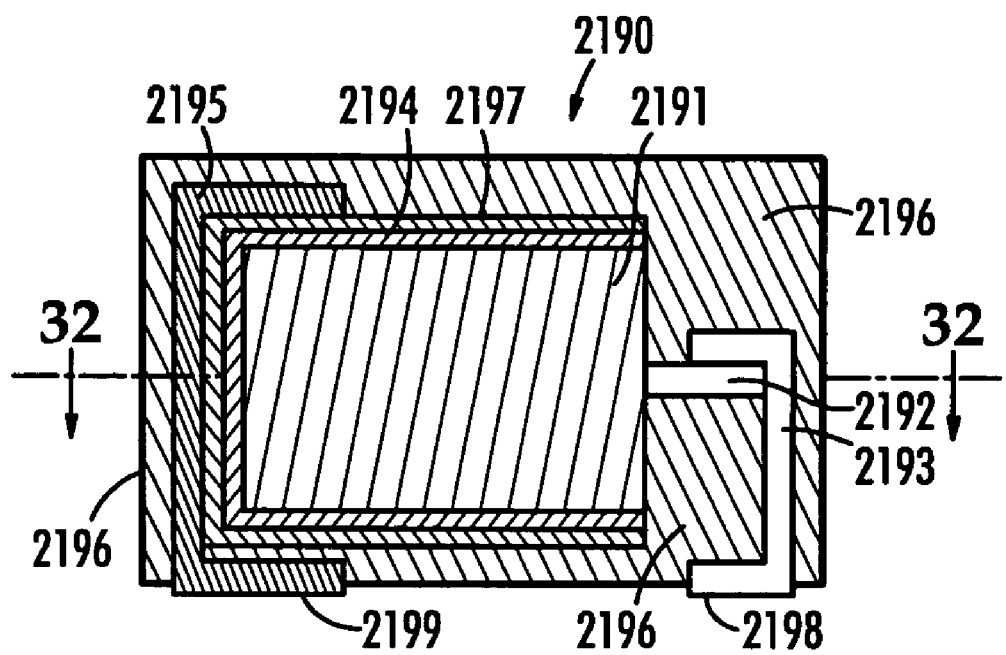
FIG. 31 is a capacitor of the present invention.
Figure 32:
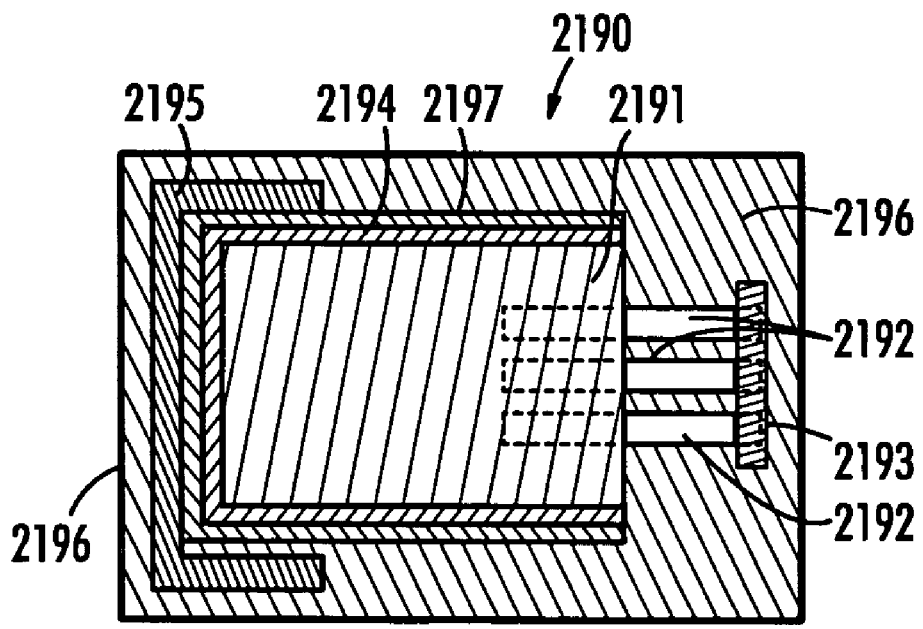
FIG. 32 is a view taken along line 32-32 of FIG. 31.

A capacitor of the present invention is illustrated in FIG. 31 and in cross-sectional view in FIG. 32. In FIG. 31, the capacitor, generally represented at 2190, comprises a fluted or offset anode, 2191, as described herein. Anode wires, 2192, are attached or integral to the anode and provide electrical connectivity between the fluted anode, 2191, and anode lead, 2193. It is preferable that the cross-sectional area of the anode wire is not round but is instead flat. More preferably, the anode wire has a cross-sectional aspect ratio of at least 2.0 to no more than 100.0. More preferably, the cross-sectional aspect ratio is at least 4.0. Below a cross-sectional aspect ratio of about 2.0 the properties approach that of a circular cross-section. Above a cross-sectional aspect ratio of about 100.0 the wire becomes structurally weak. The cross-sectional aspect ratio is defined as the ratio of the longest cross-section to the shortest cross-section. A square, for example, would have a cross-sectional aspect ratio of 1 and a cross-sectional aspect ratio of 2.0 indicates that the longest cross-sectional dimension is twice the length of the shortest cross-sectional length. The anode lead, 2193, can be electrically connected to the anode wire by any method known in the art without limit herein. A dielectric layer, 2194, is deposited on the surface of the fluted anode by any method known in the art without limit. A conductive polymer cathode layer, 2197, is deposited on the surface of the dielectric layer by any method known in the art without limit herein. The conductive polymer cathode layer is electrically connected to a cathode lead, 2195, and the entire capacitor is encased in a nonconductive resin, 2196, with the exception of the anode lead foot, 2198, and the cathode lead foot, 2199.

Figure 34:
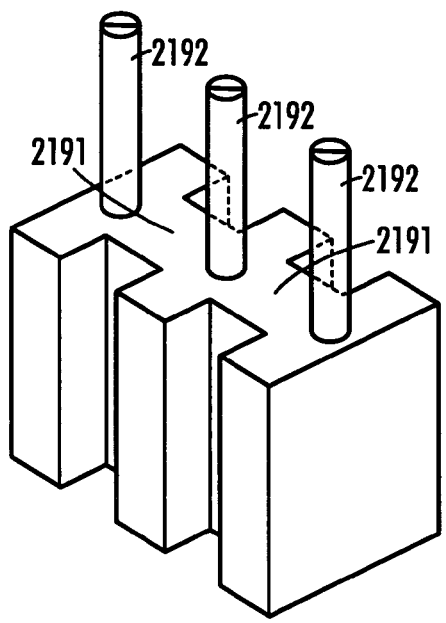
FIG. 34 is a perspective view of the anode of FIGS. 31 and 32.

An anode of the capacitor illustrated in FIGS. 31 and 32 is illustrated in FIG. 34 wherein the anode leads wires, 2192, are clearly illustrated as protruding from the fluted anode, 2191.

The anode metal includes all metals typically employed in solid capacitors including tantalum, aluminum, niobium, hafnium, zirconium, titanium, or compounds and alloys of these elements. Most preferably, the anode metal is selected from tantalum or niobium oxides, or tantalum nitrides or subnitrides.

The anode wire is preferably the same material as the metal forming the anode. The anode wire can be welded to a pressed and sintered anode or it can be inserted into the powder and secured by pressure due to the compression and sintering of the anode. Pressing the anode powder with the anode wire therein is preferred.

The dielectric layer is not limited herein and can be any dielectric commonly employed in solid capacitors. Mentioned as particularly relevant include oxides of the anode metal.

Coated on the surface of the dielectric layer is a conductive layer. The conductive layer acts as the cathode of the capacitive component. The cathode layer may comprise a primary cathode layer which covers the internal and external dielectric surfaces, and an external cathode layer comprising the primary cathode layer and one or more additional external layers. The primary cathode is preferably an organic material and particularly intrinsically conducting polymers. Mentioned as exemplary polymers are 7,7',8,8'-tetracyanoquinodimethane (TCNQ) complex, polymerized anilines, polymerized pyrroles, polymerized thiophenes such as polyethylenedioxythiophene, and derivatives thereof. Generally, the primary cathode layer is coated with a carbon layer and a metal layer such as nickel, copper, silver, or a combination of layers including carbon, and adhesive layers.

A particularly preferred conducting polymer is illustrated in Formula I:

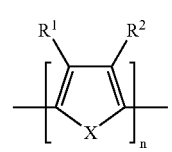

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred. For these reasons a particularly preferred polymer is 3,4-polyethylene dioxythiophene (PEDT).

In Formula 1, X is S or N most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

Both pure monomer and monomer solution in various solvents can be employed. Common oxidants including iron (III) toluenesulfonate, hydrogen peroxide, and ammonium persulfate are preferred to be used in the polymerization process.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

The polymer can be applied by any technique commonly employed in forming layers on a capacitor including dipping into a polymer solution or a polymer slurry, spraying oxidizer dopant and monomer onto the pellet or foil, allowing the polymerization to occur for a set time, and ending the polymerization with a wash. The polymer can also be applied by electrolytic deposition as well known in the art.

The protective resin is not limited herein and may include any non-conducting material commonly employed in electrical components.

The flute anode design reduces ESR. The benefits of the flute design include: a) the reduction of resistance of the cathode layer contained within the anode by reducing the path length; and 2) the reduction of resistances associated with the external cathode and graphite layers, including interfacial resistances, by increasing the surface area through which current flows through these external layers and interfaces. However, there are also drawbacks that reduce the effectiveness of the flute design. One is the increased anode internal electrical resistance due to reduced cross section area between the opposing flutes.

To determine the impact of flute depth versus resistance a series of tantalum anodes were pressed from a commercially available capacitor grade tantalum powder using a suitable organic binder as is commonly used in the industry. Each anode had a width of 0.14 inches (3.56 mm), a length of 0.19 inches (4.82 mm) a thickness of 0.067 inches (1.70 mm), flute widths of 0.022 inches (0.56 mm) and flute depths of 0.013 (0.33), 0.015 (0.38), 0.017 (0.43), 0.019 (0.48), 0.021 (0.53) inches (mm) respectively. Each anode was pressed to a density of 6 g/cc and sintered at 1375° C. for 15 min. In each anode a single tantalum wire of 0.016 inch (0.41 mm) diameter was incorporated. The electrical resistance was measured and is represented graphically in FIG. 33.

Figure 33:
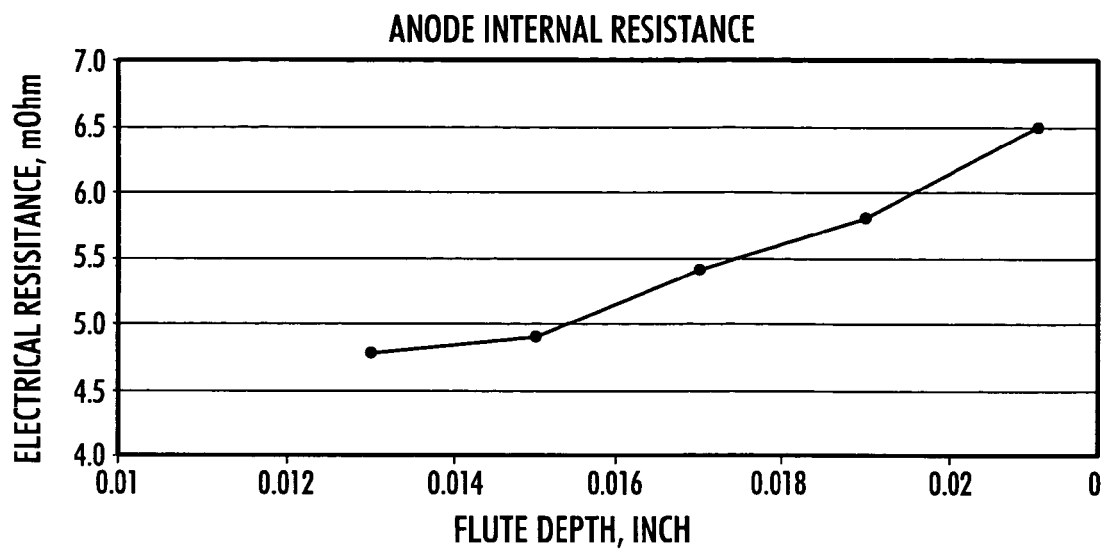
FIG. 33 graphically illustrates resistance as a function of flute depth.

The results presented in FIG. 33 clearly demonstrate the increase in electrical resistance realized by the incorporation of flutes of increasing depth. This increase in anode resistance negatively affects the ESR performance of the capacitors with fluted anode designs. The use of multi-wire anodes can effectively mitigate this negative impact. The ESR of anodes with different anode designs were evaluated to compare fluted vs. standard, or non-fluted, and 1 wire versus three wire configurations.

We have compared the ESR of $MnO_2$ fluted anodes (0.02" flute depth and 0.026 flute width, Sample 2) against that of standard (flat) anodes (Sample 1) with the same mass and overall dimensions (0.13" width, 0.19" length, and 0.066" thickness). An ESR reduction of 10 mOhms was achieved using the fluted design as shown in Table 1.

A series of tantalum anodes were prepared using S506 Powder Tantalum (Cabot Corp.) with standard lubricants and pressed to 6 g/cc press density. Each anode had a width of 0.14 inches, a length of 0.19 inches, a powder weight of 0.144 grams. The anodes were sintered at 1375° C. for 15 min. In each case 0.16 inch tantalum wires were incorporated. Four types of anodes were prepared. Two types were standard rectangular anodes with a thickness of 0.055 inches wherein one type had a single anode wire and the other type had three anode wires. The other two types comprised fluted anodes with a thickness of 0.067 inches, flute widths of 0.22 inches and a flute width of 0.019 inches. One type of fluted anode had a single anode wire and the other type of fluted anode had three anode wires. The anodes were processed using polyethylenedioxythiophene conductive polymer process in a single processing batch to minimize the process variation. ESR of eight of each type of conductive polymer coated anode was measured and summarized in Table 1.

As shown in Table 1, for a standard single wire configuration anticipated ESR reduction was not observed when a flute design was compared (Sample 4) against the standard flat anode (Sample 3).

Experiment results listed in Table 1 demonstrate the advantage of the multi-wire-fluted anode design when used with conductive polymer cathodes on a fluted anode. Comparing Samples 3 and 4, for example, the ESR is the same for standard and fluted anodes when a conductive polymer is used. Comparing samples 3 and 5 indicates that the use of multiple anode wires decreases ESR by a substantial amount. Comparing samples 5 and 6 illustrate the surprising synergistic results obtained by the combination of fluted anode, multiple anode wires and a conductive polymer cathode. In summary, a comparison of the ESR of 3 wire standard anodes (Sample 5) and 3 wire fluted anodes (Sample 6) yields a difference 0.8 mOhm, which is a 12% ESR reduction solely attributed to the unexpected synergy of multi-wire and fluted anode combination.

With the present invention an ESR of 7 mOhms or less can be achieved. More specifically, the present invention allows for the manufacture of capacitors with an ESR of 2 to 6 mOhms.

TABLE 1

Experiment results on various anode-wire configurations

| Sample # | Anode design | # of wires | Cathode material | ESR (millohms) |
|---|---|---|---|---|
| 1 | Standard | 1 | MnO$_2$ | 49 |
| 2 | Fluted | 1 | MnO$_2$ | 39 |
| 3 | Standard | 1 | Conductive polymer | 9.3 |
| 4 | Fluted | 1 | Conductive polymer | 9.3 |
| 5 | Standard | 3 | Conductive polymer | 6.9 |
| 6 | Fluted | 3 | Conductive polymer | 6.1 |

Though the use of fluted anodes has enjoyed much success, the ESR achievable thereby has reached a plateau with the recent application of conductive polymer as the cathode material, which has conductivity 100 times higher than that of its MnO$_2$ counterpart. For very low ESR conductive polymer capacitors, e.g. ESR<10 mOhm, the low ESR advantage of fluted anode design with standard single lead wire configuration can't be fully realized.

This synergistic effect of multi-wire-fluted anode configuration is a significant finding, which allows the production of ultra-low ESR capacitors beyond the capability of standard anode wire configuration designs. It should be pointed out that while in principle such configuration will result in lower ESR in any electrolytic capacitors regardless of their cathode materials, it has the most impact on low ESR conductive polymer capacitors because the anode internal resistance is a significant contributor to the ESR comparing to their non conductive polymer counterparts.

The invention has been described with particular emphasis on the preferred embodiments without limit thereto. The metes and bounds of the invention are set forth in the claims appended hereto.

The invention claimed is:

1. A capacitor comprising:
an anode body with a first side and a second side opposite to said first side;
first flutes on said first side;
at least two anode wires extending from said anode body;
a dielectric coating on said anode body; and
a conductive polymer coating on said dielectric coating forming said capacitor.

2. The capacitor of claim 1 further comprising second flutes on said second side.

3. The capacitor of claim 2 wherein said first flutes and said second flutes are offset.

4. The capacitor of claim 2 wherein said first flutes each have a first flute wall and said second flutes each have a second flute wall wherein a cross-sectional area of said anode body between a planer projection of said first flute wall and a planer projection of said second flute wall is less than 50% of the total cross-sectional area of said anode body.

5. The capacitor of claim 2 wherein a depth of said first flute (TD) is related to a depth of said second flute (BD) by the equation:

$$TD \cong BD*(1-CR)$$

wherein CR is the compaction ratio percentage defined as the final compression height divided by the initial powder fill height.

6. The capacitor of claim 1 wherein said at least two anode wires has a cross-sectional aspect ratio of at least 2.0 to no more than 100.0.

7. The capacitor of claim 1 wherein said conductive polymer coating comprises a polymer selected from intrinsically conducting polymers and doped polymers.

8. The capacitor of claim 1 wherein said conductive polymer coating comprises a material, or derivative of a material, selected from polythiophene, polyethylenedioxythiophene, polyaniline and polypyrrole.

9. The capacitor of claim 1 wherein said conductive polymer coating comprises a material, or derivative of a material selected from polyethylenedioxythiophene, 7,7',8,8'-tetracyanoquinonedimethane complex salt and polyaniline.

10. The capacitor of claim 1 wherein said anode body comprises at least one element, or alloy of an element selected from tantalum, aluminum, niobium, hafnium, zirconium and titanium.

11. The capacitor of claim 10 wherein said anode body comprises at least one element, or alloy of an element selected from niobium oxide, tantalum nitride and tantalum subnitride.

12. The capacitor of claim 1 with an ESR of less than 7 mOhms.

13. The capacitor of claim 12 with an ESR of less than 6 mOhms.

14. The capacitor of claim 13 with an ESR 2-6 mOhms.

15. A capacitor comprising:
an anode body with a first side and a second side opposite to said first side;
first flutes on said first side and second flutes on said second side; and
wherein said first flutes have a depth which is at least 50% more than a depth of said second flutes;
at least two anode leads extending from said anode body;
a dielectric coating on said anode body; and
a conductive polymer cathode on said dielectric coating.

16. The anode of claim 15 wherein said first flutes have a depth which is at least 100% more than a depth of said second flutes.

17. The anode of claim 15 wherein at least one anode lead of said at least two anode leads has an aspect ratio of at least 2.0 to no more than 100.0.

18. The capacitor of claim 15 further comprising a cathode lead frame.

19. The capacitor of claim 15 wherein said cathode lead frame is on said first side of said anode.

20. The capacitor of claim 15 wherein said cathode lead frame is on said second side of said anode.

21. The capacitor of claim 15 wherein said conductive polymer coating comprises a polymer selected from intrinsically conducting polymers.

22. The capacitor of claim 15 wherein said conductive polymer coating comprises a material, or derivative of a material selected from polythiophene, polyethylenedioxythiophene, polyaniline and polypyrrole.

23. The capacitor of claim 15 wherein said conductive polymer coating comprises a material, or derivative of a material selected from polyethylenedioxythiophene, 7,7',8,8'-tetracyanoquinonedimethane complex salt and polyaniline.

24. The capacitor of claim 15 wherein said anode body comprises at least one element, or alloy of an element selected from tantalum, aluminum, niobium, hafnium, zirconium and titanium.

25. The capacitor of claim 24 wherein said anode body comprises at least one element, or alloy of an element selected from niobium oxide, tantalum nitride and tantalum subnitride.

26. The capacitor of claim 15 with an ESR of less than 7 mOhms.

27. The capacitor of claim 26 with an ESR of less than 6 mOhms.

28. The capacitor of claim 27 with an ESR 2-6 mOhms.

29. A capacitor comprising:
an anode body with a first side and a second side opposite to said first side;
first flutes on said first side; and
at least two anode wires extending from said anode wherein at least one anode wire of said at least two anode wires has a cross-sectional aspect ratio of at least 2.0 to no more than 100.0;
a dielectric coated on said anode body; and
a conductive polymer coated on said dielectric.

30. The capacitor of claim 29 wherein at least two anode wires have a cross-sectional aspect ratio of at least 2.0 to no more than 100.0.

31. The capacitor of claim 29 further comprising second flutes on a second side.

32. The capacitor of claim 31 wherein said first flutes have a depth which is at least 50% more than a depth of said second flutes.

33. The capacitor of claim 32 wherein said first flutes have a depth which is at least 100% more than a depth of said second flutes.

34. The capacitor of claim 33 wherein said first flutes have a depth which is at least 200% more than a depth of said second flutes.

35. The capacitor of claim 29 wherein said conductive polymer coating comprises a polymer selected from intrinsically conducting polymers.

36. The capacitor of claim 29 wherein said conductive polymer coating comprises a material, or derivative of a material selected from polythiophene, polyethylenedioxythiophene, polyaniline and polypyrrole.

37. The capacitor of claim 29 wherein said conductive polymer coating comprises a material, or derivative of a material selected from polyethylenedioxythiophene, 7,7',8,8'-tetracyanoquinonedimethane complex salt and polyaniline.

38. The capacitor of claim 29 wherein said anode body comprises at least one element, or alloy of an element selected from tantalum, aluminum, niobium, hafnium, zirconium and titanium.

39. The capacitor of claim 38 wherein said anode body comprises at least one element, or alloy of an element selected from niobium oxide, tantalum nitride and tantalum subnitride.

40. The capacitor of claim 29 with an ESR of less than 7 mOhms.

41. The capacitor of claim 40 with an ESR of less than 6 mOhms.

42. The capacitor of claim 41 with an ESR 2-6 mOhms.

* * * * *